No. 760,353. Patented May 17, 1904.

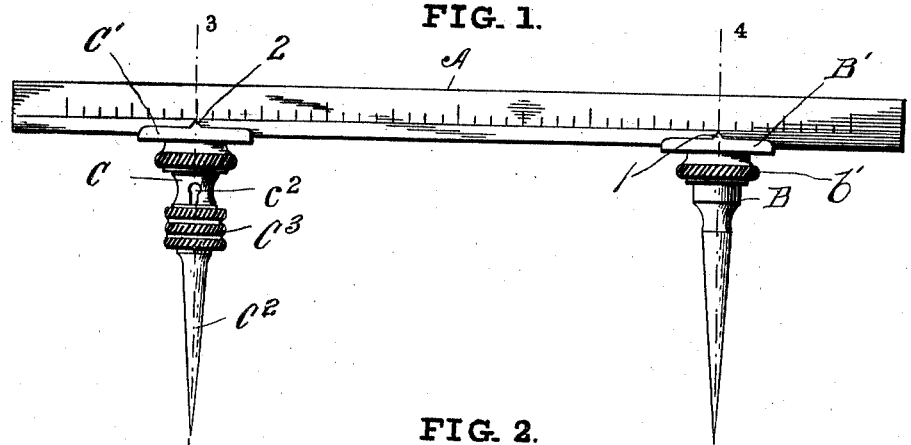
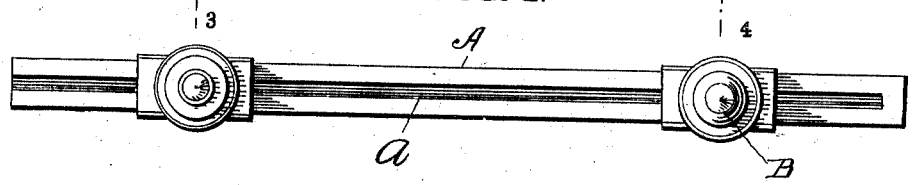
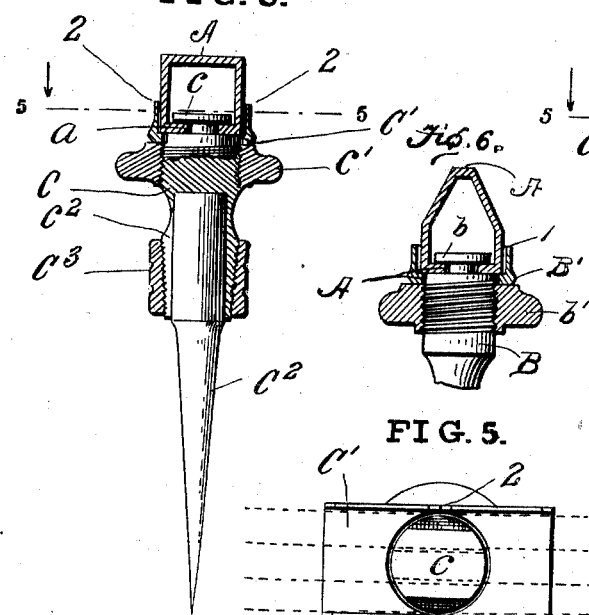
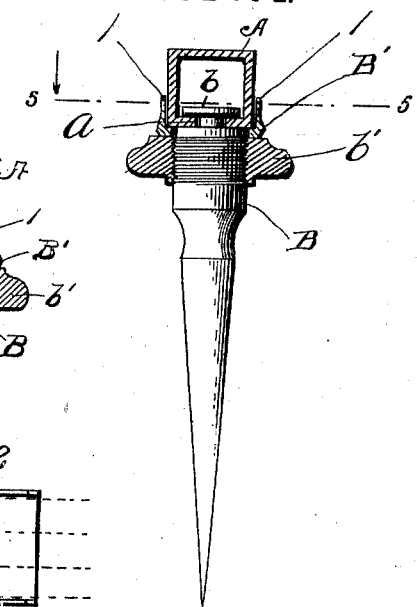
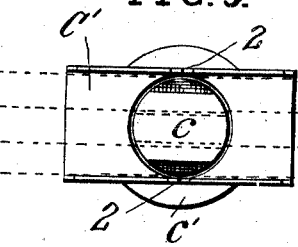

UNITED STATES PATENT OFFICE.

NATHANIEL B. STONE, OF OUTLOOK, WASHINGTON.

BEAM-COMPASS.

SPECIFICATION forming part of Letters Patent No. 760,353, dated May 17, 1904.

Application filed January 21, 1903. Serial No. 139,952. (No model.)

*To all whom it may concern:*

Be it known that I, NATHANIEL B. STONE, a citizen of the United States, residing at Outlook, in the county of Yakima and State of Washington, have invented certain new and useful Improvements in Beam-Compasses, of which the following is a specification.

The object of my said invention is to provide a beam-compass the back edge and sides whereof shall be left free and unincumbered, thereby permitting the use of said back edge for a straight-edge and leaving the scale on the sides uncovered from end to end of the beam at all times, all as will be hereinafter more fully described and claimed.

Referring to the accompanying drawings, which are made a part hereof, and on which similar reference characters indicate similar parts, Figure 1 is a side elevation of a beam-compass embodying my said invention; Fig. 2, an under side plan of the same; Fig. 3, a cross-section on the dotted line 3 3 in Fig. 1; Fig. 4, a similar section on the dotted line 4 4; Fig. 5, a view looking downwardly from dotted lines 5 5 in Figs. 3 and 4, the beam being indicated by dotted lines; and Fig. 6, a view of a modified form.

In said drawings the portion marked A represents the beam, B one of the points, and C a socket for containing the other point.

The beam A is of a rectangular form, preferably hollow, and is formed with a central groove or slot in its front face. Its back edge is straight to adapt it for use as a straight-edge, and a graduated scale is formed on one or both of its side faces by which the position of the points may be accurately and easily determined.

The point B is formed with a head $b$ on its base and with a groove on each side near said head to form a neck which will slide readily in a slot or groove $a$ in the front face of the beam. Near its base said point is formed screw-threaded and has a nut $b'$ on said screw-threaded portion. A flanged plate B' is mounted to slide on the face of said beam and contains a central aperture of a size to receive the base end of point B. Indicating-points 1 are formed in the center of the flanges of said plate, said points being exactly in line with the center of point B. Said plate B' is mounted on the end of point B, the head $b$ extending through said plate. Said head is then slid into the slot $a$ of the beam and adjusted to the position desired on said beam. The plate is then securely locked in said position by tightening the nut $b'$, which draws the head against the inner face of the beam, as will be readily understood. When it is desired to move said point, the nut $b'$ is loosened and the point slid to the desired position, and then said nut is again tightened, thus securing said point in any position very quickly and easily, as will be readily seen.

The socket C is formed at its base similar to the construction of the base of point B and has a head $c$, a nut $c'$, and a flanged plate C', having indicating-points 2, arranged and operating exactly as described for the corresponding parts shown in Fig. 4. The outer end of said socket is formed to contain a point $C^2$, being slotted on one side at $c^2$ and formed tapered and screw-threaded at its outer end, with a nut $C^3$ mounted thereon, by which said point $C^2$ may be locked in place. Said point $C^2$ may thus be interchanged with other points of ordinary construction when desired.

Instead of a beam of rectangular formation one formed tapered on its sides from back of the flanges of plates B' and C', as shown in Fig. 6, may be used if preferred. The angle of taper is such that the sides of the nuts will support the instrument when used as a straight-edge. Other modifications in form and details may be made without departing from my said invention.

Having thus fully described my said invention, what I claim as new, and desire to secure by Letters Patent, is—

1. A beam-compass, the beam whereof is formed with a slot or groove in one side, and the points mounted to project at right angles from said side and to slide and be secured in said groove, and securing devices on the same side of the beam as the slot, whereby the other sides of the beam are left with free and unobstructed surfaces, substantially as set forth.

2. A beam-compass the beam whereof is formed with a T-groove in one side, points provided with heads adapted to fit inside said groove, the points projecting at right angles from said side, and nuts on the base of each of said points adapted to bear against the face of said side to secure said points in position, substantially as set forth.

3. A beam-compass the beam whereof is rectangular in cross-section and formed with a groove in one side, points formed with heads adapted to be mounted in said groove and be supported at right angles with said side, clamping-nuts mounted on the base of each of said points between the ends of said points and the face of the beam, and a plate between said nuts and said beam, substantially as set forth.

4. A beam-compass, the beam whereof has a groove or slot in one side, points having heads engaging within said groove, nuts mounted on the base of said points, flanged plates mounted between said nuts and the face of said beam formed with indicating-points on their flanges, substantially as set forth.

5. A beam-compass, the beam whereof is provided with a slot or groove in one face, formed with a straight-edge on its opposite side and provided with an indicating-scale upon its side face, points provided with heads mounted within said slot or groove, means for clamping said heads within said slot or groove, and indicating-points connected therewith, substantially as set forth.

In witness whereof I have hereunto set my hand and seal, at Washington, District of Columbia, this 19th day of January, A. D. 1903.

NATHANIEL B. STONE. [L. S.]

Witnesses:
    E. W. BRADFORD,
    IRA B. DALRYMPLE.